United States Patent
Kobayashi et al.

(10) Patent No.: US 7,915,189 B2
(45) Date of Patent: Mar. 29, 2011

(54) YTTRIUM OXIDE MATERIAL, MEMBER FOR SEMICONDUCTOR-MANUFACTURING APPARATUS, AND METHOD FOR PRODUCING YTTRIUM OXIDE MATERIAL

(75) Inventors: Yoshimasa Kobayashi, Nagoya (JP); Yuji Katsuda, Tsushima (JP)

(73) Assignee: NGK Insulators, Ltd., Nagoya (JP)

( * ) Notice: Subject to any disclaimer, the term of this patent is extended or adjusted under 35 U.S.C. 154(b) by 164 days.

(21) Appl. No.: 12/400,194

(22) Filed: Mar. 9, 2009

(65) Prior Publication Data
US 2009/0233087 A1 Sep. 17, 2009

(30) Foreign Application Priority Data
Mar. 11, 2008 (JP) .................. 2008-061334

(51) Int. Cl.
*C04B 35/505* (2006.01)
*C04B 35/488* (2006.01)

(52) U.S. Cl. ...................... 501/152; 501/103
(58) Field of Classification Search .................. 501/103, 501/152
See application file for complete search history.

(56) References Cited

U.S. PATENT DOCUMENTS

| | | | | |
|---|---|---|---|---|
| 7,375,046 B2 * | 5/2008 | Aihara et al. | ................. | 501/152 |
| 7,696,117 B2 * | 4/2010 | Sun et al. | ................. | 501/134 |
| 7,701,693 B2 * | 4/2010 | Hattori et al. | ................. | 361/234 |
| 7,776,774 B2 * | 8/2010 | Kobayashi et al. | ................. | 501/103 |
| 7,799,719 B2 * | 9/2010 | Ide et al. | ................. | 501/152 |
| 7,833,924 B2 * | 11/2010 | Kobayashi et al. | ................. | 501/152 |
| 2007/0042897 A1 * | 2/2007 | Aihara et al. | ................. | 501/152 |

FOREIGN PATENT DOCUMENTS

JP 2006-069843 3/2006
JP 2006199562 * 8/2006

* cited by examiner

*Primary Examiner* — Karl E Group
(74) *Attorney, Agent, or Firm* — Burr & Brown

(57) ABSTRACT

An electrostatic chuck that is a member for a semiconductor-manufacturing apparatus contains an yttrium oxide material containing first inorganic particles and second inorganic particles. The first inorganic particles form solid solutions in yttrium oxide, can be precipitated from yttrium oxide, and are present in grains of yttrium oxide. The second inorganic particles can form solid solutions in the first inorganic particles, are unlikely to form any solid solution in yttrium oxide, and are present at boundaries between the yttrium oxide grains. The first inorganic particles contain at least one of $ZrO_2$ and $HfO_2$. The second inorganic particles contain at least one selected from the group consisting of MgO, CaO, SrO, and BaO. The yttrium oxide material is produced in such a manner that solid solution particles are prepared by mixing and firing the first and second inorganic particles and are mixed with yttrium oxide and the mixture is fired.

12 Claims, 3 Drawing Sheets

FIG. 5A EXAMPLE 10

FIG. 5B EXAMPLE 12

FIG. 5C EXAMPLE 18

FIG. 5D EXAMPLE 21

YTTRIUM OXIDE MATERIAL, MEMBER FOR SEMICONDUCTOR-MANUFACTURING APPARATUS, AND METHOD FOR PRODUCING YTTRIUM OXIDE MATERIAL

BACKGROUND OF THE INVENTION

1. Field of the Invention

The present invention relates to an yttrium oxide material, a member for a semiconductor-manufacturing apparatus, and a method for producing the yttrium oxide material.

2. Description of the Related Art

Japanese Unexamined Patent Application Publication No. 2006-69843 (hereinafter referred to as Patent Document 1) discloses an yttrium oxide material for ceramic members for semiconductor-manufacturing apparatuses. The yttrium oxide material contains yttrium oxide and 2% to 30% by weight silicon carbide with a particle size of 0.03 to 5 µm, is electrically conductive, and has corrosion resistance and durability to halogen plasma gas.

The yttrium oxide material disclosed in Patent Document 1 contains such silicon carbide so as to be electrically conductive and so as to have corrosion resistance and durability during semiconductor manufacture; however, properties thereof are insufficient. Therefore, there has been a need for yttrium oxide materials with improved properties such as high mechanical strength.

The present invention has been made to cope with such a need. It is a principal object of the present invention to provide an yttrium oxide material with increased mechanical strength, a member for a semiconductor-manufacturing apparatus, and a method for producing the yttrium oxide material.

The inventors have conducted intensive studies to achieve the object and have found that the presence of inorganic particles in yttrium oxide grains and at boundaries therebetween is effective in increasing mechanical strength. This has led to the completion of the present invention.

SUMMARY OF THE INVENTION

An yttrium oxide material according to the present invention contains first inorganic particles which form solid solutions in yttrium oxide at a first temperature, which can be precipitated from yttrium oxide at a second temperature lower than the first temperature, and which are present in grains of yttrium oxide and also contains second inorganic particles which can form solid solutions in the first inorganic particles, which have a solid solubility limit, for yttrium oxide, less than that of the first inorganic particles, and which are present at boundaries between the yttrium oxide grains.

A method for producing an yttrium oxide material according to the present invention includes a first preparation step of preparing solid solution particles in such a manner that a first source powder containing first inorganic particles which form solid solutions in yttrium oxide at a first temperature and which can be precipitated from yttrium oxide at a second temperature lower than the first temperature is mixed with a second source powder containing second inorganic particles which can form solid solutions in the first inorganic particles and which have a solid solubility limit, for yttrium oxide, less than that of the first inorganic particles and the mixture is fired and also includes a second preparation step of mixing the solid solution particles with a third source powder containing yttrium oxide and firing the mixture of the solid solution particles and the third source powder such that the first inorganic particles are present in grains of yttrium oxide and the second inorganic particles are present at boundaries between the yttrium oxide grains.

The yttrium oxide material; a member, containing the yttrium oxide material, for a semiconductor-manufacturing apparatus; and the yttrium oxide material-producing method are effective in achieving higher mechanical strength. The reason why such an effect is obtained is unclear and is probably as described below. For example, in a course in which the solid solution particles are prepared by firing the first and second inorganic particles in advance and then mixed with yttrium oxide and the mixture is fired, the following phenomenon occurs: the first and second inorganic particles are degraded, the first inorganic particles form solid solutions in the yttrium oxide grains, the second inorganic particles are precipitated at the boundaries between the yttrium oxide grains, and the first inorganic particles are then precipitated in the yttrium oxide grains during cooling subsequent to firing. The precipitated first and second inorganic particles have a smaller size as compared to those added to yttrium oxide without forming any solid solution. This prevents, for example, boundary separation due to the thermal expansion and shrinkage of the second inorganic particles and yttrium oxide or due to the thermal expansion and shrinkage of the first inorganic particles and yttrium oxide. Therefore, higher mechanical strength can be probably achieved.

DESCRIPTION OF THE PREFERRED EMBODIMENTS

Figure 1A:
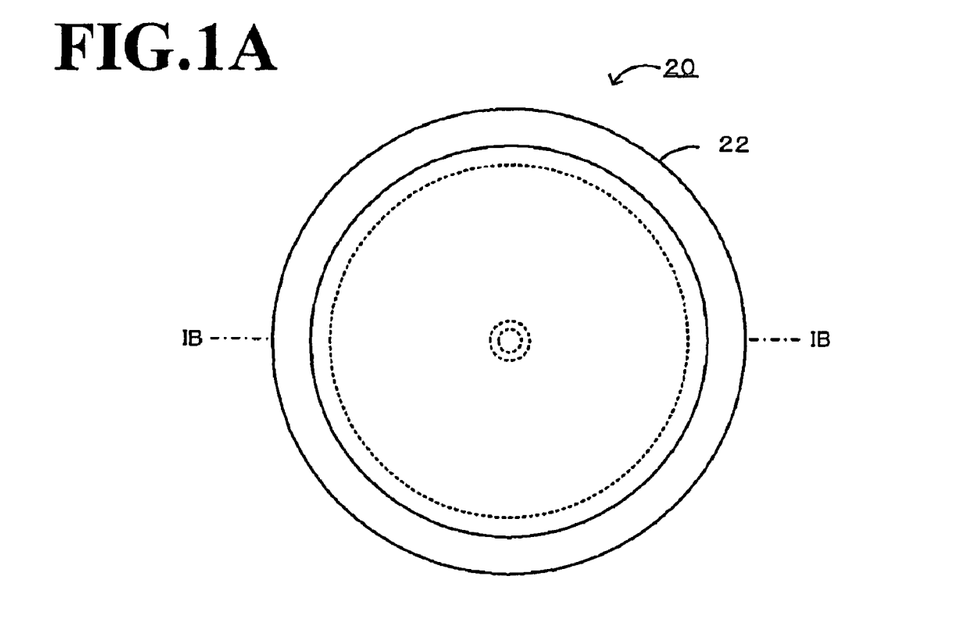
FIG. 1A is a schematic plan view of an electrostatic chuck 20 according to an embodiment of the present invention.
Figure 1B:
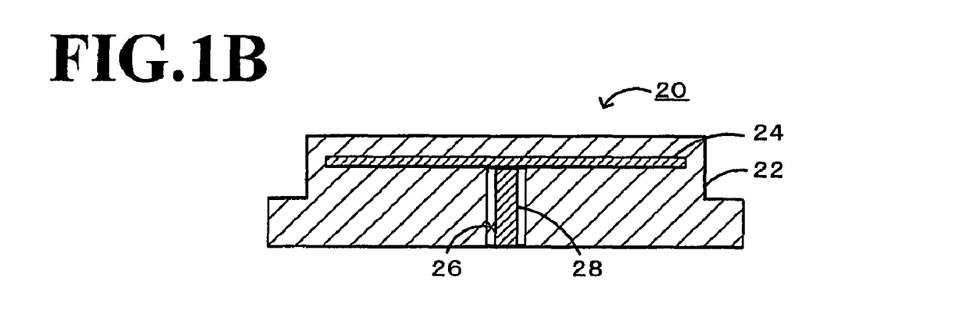
FIG. 1B is a sectional view taken along the line A-A of FIG. 1A.

Embodiments of the present invention will now be described with reference to the accompanying drawings. FIG. 1A is a schematic plan view of an electrostatic chuck 20 according to an embodiment of the present invention. FIG. 1B is a sectional view taken along the line IB-IB of FIG. 1A. The electrostatic chuck 20 is configured as a member for a semiconductor-manufacturing apparatus, the member being used to support, adsorb, and hold a silicon wafer. With reference to FIGS. 1A and 1B, the electrostatic chuck 20 includes a base 22 which is disk-shaped and which includes a lower stage and an upper stage having a circumference less than that of the lower stage, an electrostatic electrode 24 which is disposed in the base 22 and which generates electrostatic adsorption force; and a terminal 28 extending through a hole portion 26, extending from the center of the base 22 to open downward, to the electrostatic electrode 24.

The base 22 of the electrostatic chuck 20 is made of an yttrium oxide material containing at least first inorganic particles present in grains of yttrium oxide, and second inorganic particles present at boundaries between the yttrium oxide grains. In the yttrium oxide material, the first inorganic particles form solid solutions in yttrium oxide at a predetermined first temperature and can be precipitated from yttrium oxide at a second temperature lower than the first temperature. The first inorganic particles may contain at least one of $ZrO_2$ and $HfO_2$ and preferably contains $ZrO_2$. The first inorganic particles preferably have an average size of 1 μm or less and more preferably 0.5 μm or less. When the average size thereof is 1 μm or less, the yttrium oxide material can be increased in mechanical strength. The second inorganic particles can form solid solutions in the first inorganic particles and have a solid solubility limit, for yttrium oxide, less than that of the first inorganic particles. The second inorganic particles may contain at least one selected from the group consisting of MgO, CaO, SrO, and BaO and preferably contains MgO. The second inorganic particles preferably have an average size of 1 μm or less and more preferably 0.5 μm or less. When the average size thereof is 1 μm or less, the yttrium oxide material can be increased in mechanical strength. The yttrium oxide grains and the grain boundaries can be strengthened in such a manner that the first inorganic particles and the second inorganic particles, which both have an average size of 1 μm or less, are distributed in the yttrium oxide grains and at the grain boundaries, respectively, whereby the mechanical strength of the yttrium oxide material can be effectively increased. The average size of the first and second inorganic particles is determined in such a manner that a surface of the yttrium oxide material is thermally etched and then observed with a scanning electron microscope (SEM) at a magnification sufficient to observe the first and second inorganic particles, that is, a magnification of, for example, 2,000 to 100,000 times; the first or second inorganic particles present in an observed region are measured for breadth; and the obtained measurements are averaged.

Figure 2:
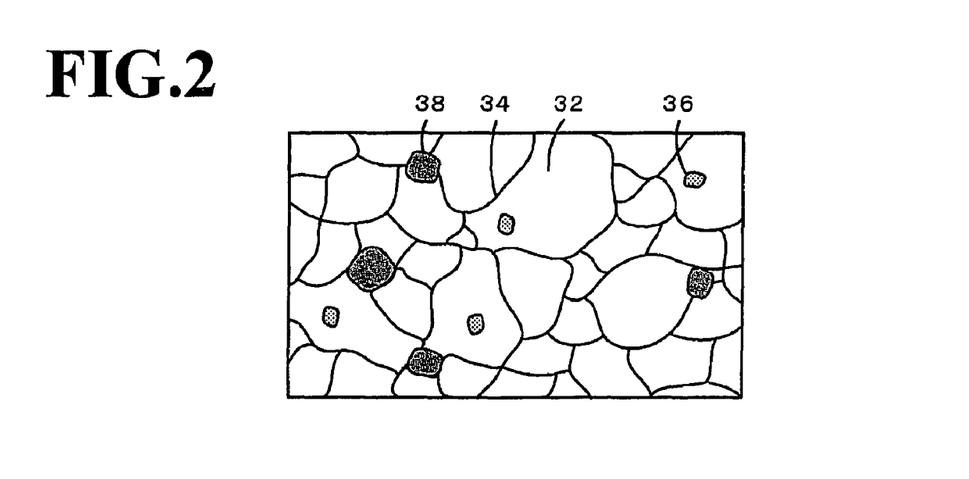
FIG. 2 is a schematic enlarged view of a surface of an yttrium oxide material contained in the electrostatic chuck 20.

The electrostatic chuck 20 contains the yttrium oxide material, which contains $ZrO_2$ as the first inorganic particles containing and MgO as the second inorganic particles. FIG. 2 is a schematic enlarged view of a surface of the yttrium oxide material, which is contained in the electrostatic chuck 20. The yttrium oxide material contains the yttrium oxide grains 32 bonded to each other with the grain boundaries 34 disposed therebetween, zirconium oxide particles 36 present in the yttrium oxide grains 32, and magnesium oxide particles 38 present at the grain boundaries 34.

The yttrium oxide material may further contain fluorine (F). The form of F contained therein is not particularly limited and may be, for example, $YF_3$ or YOF. The yttrium oxide material preferably contains F, because the yttrium oxide material containing F can be sintered at low temperature and has good mechanical strength. When the yttrium oxide material is exposed to corrosive halogen gas such as $NF_3$, F contained therein can reduce the change in volume due to the production of a reactant, such as $YF_3$, caused by the reaction of yttrium oxide and has a function of preventing reaction products from forming particles.

The yttrium oxide material preferably has a four-point bending strength of 200 MPa or more, more preferably 220 MPa or more, and further more preferably 250 MPa or more. When the four-point bending strength thereof is 200 MPa or more, the yttrium oxide material is suitable for members used for semiconductor-manufacturing apparatuses. The yttrium oxide material preferably has a fracture toughness of 1.5 $MPa·m^{1/2}$ or more, more preferably 1.7 $MPa·m^{1/2}$ or more, and further more preferably 1.9 $MPa·m^{1/2}$ or more. When the fracture toughness thereof is 1.5 $MPa·m^{1/2}$ or more, the yttrium oxide material is suitable for members used for semiconductor-manufacturing apparatuses. The four-point bending strength thereof is determined in accordance with JIS-R 1601. The fracture toughness thereof is determined by an IF method (a load of 9.8 N) according to JIS-R 1607. The yttrium oxide material preferably has a volume resistivity of $1×10^{15}$ Ωcm or more and more preferably $1×10^{16}$ Ωcm or more at 20° C. When the volume resistivity thereof is $1×10^{15}$ Ωcm or more, the yttrium oxide material is suitable for insulating members used for semiconductor-manufacturing apparatuses.

The yttrium oxide material preferably has a density of 5.0 to 5.3 $g/cm^3$ depending on an element contained therein. The yttrium oxide material preferably has an open porosity of 5% or less and more preferably 0.5% or less. When the open porosity thereof is 5% or less, the yttrium oxide material can be increased in mechanical strength. The density and open porosity thereof are determined by an Archimedean method in accordance with JIS-R 1634 using pure water as a medium.

An exemplary method for manufacturing the electrostatic chuck 20 will now be described. The electrostatic chuck 20—manufacturing method may includes (1) a first preparation step of preparing solid solution particles in such a manner that a first source powder containing the first inorganic particles is mixed with a second source powder containing the second inorganic particles and the mixture is fired, (2) a second preparation step of mixing the solid solution particles with a third source powder containing yttrium oxide and firing the mixture of the solid solution particles and the third source powder, and (3) a heat treatment step of performing heat treatment at a temperature lower than the firing temperature of the second preparation step, the heat treatment step being subsequent to the second preparation step.

(1) First Preparation Step

In the first preparation step, the first and second source powders are weighed and then mixed together. For example, a ball mill may be used to mix the first and second source powders. An appropriate solvent may be added to the mixture of the first and second source powders to prepare slurry. Preferred examples of the solvent include organic solvents such as alcohols including isopropyl alcohol. Examples of the first inorganic particles include $ZrO_2$ particles and $HfO_2$ particles. Examples of the second inorganic particles include MgO particles, CaO particles, SrO particles, and BaO particles. One or more of these types of particles may be used. In particular, the $ZrO_2$ particles and the MgO particles are preferable. The percentage of the second inorganic particles in a source powder for preparing the solid solution particles from the first and second source powders is preferably 5% or more, and more preferably 10% to 20% by volume. The percentage of the first inorganic particles in the source powder is preferably 95% or less, and more preferably 80% to 90% by volume. The percentage of the second inorganic particles and that of the first inorganic particles are preferably within the above ranges, because the yttrium oxide material has good properties such as high mechanical strength. The slurry prepared as described above may be dried at 40° C. to 200° C. The slurry is preferably dried in an inert atmosphere such as a nitrogen atmosphere or an argon atmosphere.

The mixture of the first and second source powders is shaped and then fired, whereby a solid solution containing the first and second inorganic particles is prepared. When the first source powder contains $ZrO_2$ and the second source powder contains MgO, the firing temperature of the mixture of the first and second source powders is preferably 1400° C. to 1800° C. and more preferably 1500° C. to 1600° C. When the firing temperature thereof is 1400° C. or higher, the solid solution can be sufficiently formed. When the firing temperature thereof is 1800° C. or lower, the energy consumed during firing can be reduced. The mixture thereof is fired in an inert atmosphere such as a nitrogen atmosphere or an argon atmosphere. The obtained solid solution is ground into the solid solution particles. The solid solution is preferably wet-ground in a ball mill or the like. The solid solution particles preferably have an average size of 1 μm or less and more preferably 0.5 μm or less. This allows the solid solution particles to be present in the yttrium oxide grains and at the grain boundaries after firing. The average size thereof indicates the median diameter (D50) calculated from the size distribution of particles measured by laser diffraction/scattering.

(2) Second Preparation Step

In this step, the solid solution particles prepared in the first preparation step is mixed with yttrium oxide ($Y_2O_3$), this mixture is formed into a preform having a predetermined shape, and the preform is fired. The solid solution particles and yttrium oxide ($Y_2O_3$) may be wet-mixed in, for example, a ball mill or the like. A fluorine compound is preferably added to a source powder for preparing the yttrium oxide material. This allows the yttrium oxide material to have relatively high strength even if the firing temperature of the source powder is reduced; hence, the energy consumed during firing can be reduced while the mechanical strength of the yttrium oxide material is maintained. The fluorine compound is preferably in the form of $REF_3$ (RE represents a rare-earth element). Preferred examples of the fluorine compound include $YF_3$ and $LaF_3$. The amount of the fluorine compound added is, for example, 0% to 3% and more preferably 0.5% to 2% of the volume of the source powder. When the amount of the fluorine compound added is 0.5% to 2% of the volume of the source powder, the volume resistivity of the yttrium oxide material can be prevented from being reduced and the mechanical strength thereof can be maintained well. In the second preparation step, the preform may be formed by a molding process using a mold, a CIP process, a slip casting process, or the like and then fired at atmospheric pressure by an atmospheric firing process. Alternatively, the preform may be fired by a hot-press firing process in which the preform is pressed so as to have a predetermined shape. The latter is more preferable. The preform is preferably fired in an inert atmosphere such as a nitrogen atmosphere or an argon atmosphere. For the hot-press firing process, the pressure applied to the preform is preferably adjusted depending on the size of the preform and may range from, for example, 50 to 200 $kg/cm^2$. The firing temperature of the preform is preferably 1300° C. to 1900° C. When the solid solution particles contain $ZrO_2$ and MgO, the firing temperature thereof is preferably 1400° C. to 1800° C. and more preferably 1500° C. to 1600° C. When the firing temperature thereof is 1400° C. or higher, the yttrium oxide material can be densified and can be increased in mechanical strength. When the firing temperature thereof is 1800° C. or lower, grain growth can be suppressed and the energy consumed during firing can be reduced.

In the case where the electrostatic chuck 20 is formed and then fired, a single piece formed from the base 22 and the electrostatic electrode 24 may be fired or the base 22 and the electrostatic electrode 24 may be separately formed and then fired. For example, the following procedure may be used: the lower stage of the base 22, which has the hole portion 26 shown in FIG. 1, is formed; the electrostatic electrode 24 is formed; the upper stage of the base 22 is formed; and the base 22 and the electrostatic electrode 24 are fired. The electrostatic electrode 24 is formed from paste, prepared in advance, containing an electrode component such as platinum (Pt) or gold (Au). The paste for forming the electrostatic electrode 24 preferably contains a ceramic powder such that the electrostatic electrode 24 has a thermal expansion coefficient substantially equal to that of the base 22. A formed body that does not include the electrostatic electrode 24 may be prepared from the yttrium oxide material. During firing in the second preparation step, $Y_2O_3$, a component of the first inorganic particles, and/or a component of the second inorganic particles possibly forms a solid solution or a precipitate. For example, the following change possibly occurs during firing or cooling: the first inorganic particles present in yttrium oxide in the form of solid solution are precipitated or the second inorganic particles are precipitated at the grain boundaries.

(3) Heat Treatment Step

In this step, which is subsequent to the second preparation step, heat treatment is performed at a temperature lower than the firing temperature of the second preparation step. It is thought that, according to this step, the first inorganic particles can be precipitated sufficiently in the yttrium oxide grains. This is effective in achieving high mechanical strength. The heat treatment step is preferably performed in such a manner that the preform fired at the above firing temperature in the second preparation step is subsequently heat-treated without intermission. The heat-treating temperature of the preform is preferably 100° C. to 500° C. lower than the firing temperature of the second preparation step and more preferably 200° C. to 400° C. lower than the firing temperature thereof. When the solid solution particles contain $ZrO_2$ and MgO, the heat-treating temperature thereof is preferably 1200° C. to 1400° C. In particular, when the firing temperature of the second preparation step is 1600° C., the heat-treating temperature thereof is preferably 1200° C. to 1400° C. In this step, the atmosphere used in the second preparation step is successively used, that is, an inert atmosphere such as a nitrogen atmosphere or an argon atmosphere is preferably used. These steps allow the electrostatic chuck 20 to be prepared from the yttrium oxide material, which is prevented from being reduced in volume resistivity and has increased mechanical strength.

As described above in detail, the electrostatic chuck 20 of this embodiment contains the yttrium oxide material, which contains the first inorganic particles ($ZrO_2$) and the second inorganic particles (MgO), and therefore can be increased in mechanical strength, volume resistivity, and the like. The first inorganic particles form solid solutions in yttrium oxide, can be precipitated in yttrium oxide, and are present in the yttrium oxide grains. The second inorganic particles can form solid solutions in the first inorganic particles, have a solid solubility limit, for yttrium oxide, less than that of the first inorganic particles, and are present at the boundaries between the yttrium oxide grains.

The present invention is not limited to the above embodiment. Various modifications may be made within the technical scope of the present invention.

In the above embodiment, the electrostatic chuck 20 was described as a member containing the yttrium oxide material. The yttrium oxide material may be used for semiconductor-manufacturing members such as a dome-shaped chamber member for accommodating the electrostatic chuck 20, a susceptor equipped with a heater, a dummy focus ring placed outside the electrostatic chuck 20, a clamping ring for fixing a silicon wafer, and a heater for heating a silicon wafer. The yttrium oxide material may be used for various applications, such as members based on the corrosion resistance of the yttrium oxide material, other than semiconductor-manufacturing applications.

The method for producing the yttrium oxide material includes the heat treatment step as described in the above embodiment and need not include the heat treatment step. Even if the method does not include the heat treatment step, the first preparation step allows the yttrium oxide material to have increased mechanical strength.

In the method for producing the yttrium oxide material, $ZrO_2$, MgO, and $Y_2O_3$ are mixed together and then fired as described in the above embodiment. For example, a Zr salt converted into $ZrO_2$ by firing and an Mg salt converted into MgO by firing may be used to prepare solid solutions of $ZrO_2$ and MgO in the first preparation step. Furthermore, a Y salt converted into $Y_2O_3$ by firing may be used in the second preparation step.

EXAMPLES

Examples conducted to produce yttrium oxide materials will now be described.

Example 1

First Preparation Step

A source powder containing zirconium oxide ($ZrO_2$) and 10% by mole magnesium oxide (MgO) was prepared and then mixed with an isopropyl alcohol (IPA) solvent for 16 hours in a ball mill containing $ZrO_2$ balls, whereby slurry was prepared. After being sieved through a 100-mesh screen, the slurry was dried at 110° C. for 16 hours in a nitrogen atmosphere, whereby powder was obtained. After the obtained powder was sieved through a 30-mesh screen, 80 g of the powder was formed into a disk having a diameter of 50 mm at a pressure of 200 kg/cm². The disk was fired at 1500° C. and atmospheric pressure for eight hours in a nitrogen atmosphere, whereby MgO-stabilized $ZrO_2$ was synthesized. The synthesized MgO-stabilized $ZrO_2$ was ground in a mortar, wet-ground for 24 hours in a ball mill containing $ZrO_2$ balls using an IPA solvent, and then dried at 110° C. for 16 hours in a nitrogen atmosphere, whereby powder with an average particle size of 1 μm was obtained. The obtained MgO-stabilized $ZrO_2$ is hereinafter simply referred to as "Z10M". A preparation containing $ZrO_2$ and 13% by mole MgO was prepared and then treated through the same steps as above, whereby a powder of MgO-stabilized $ZrO_2$ (hereinafter simply referred to as "Z13M") was prepared. The average size of each powder indicates the median diameter (D50) determined by measuring the powder with a laser diffraction-scattering particle size distribution analyzer, LA-750, available from Horiba Limited using water as a dispersion medium.

Second Preparation Step

A preparation containing 95% yttrium oxide ($ZrO_2$), 5% Z10M, and 0% yttrium fluoride ($YF_3$) on a volume basis was prepared and then wet-mixed for 16 hours in a ball mill containing $ZrO_2$ balls using an IPA solvent, whereby slurry was prepared. After being sieved through a 100-mesh screen, the slurry was dried at 110° C. for 16 hours in a nitrogen atmosphere, whereby powder was obtained. After the obtained powder was sieved through a 30-mesh screen, 80 g of the powder was formed into a disk having a diameter of 50 mm at a pressure of 200 kg/cm². The disk was subjected to hot press firing at 1600° C. and a pressure of 200 kg/cm² for four hours in a nitrogen atmosphere, whereby an yttrium oxide material was obtained.

Examples 2 and 3

In Example 2, an yttrium oxide material was prepared in substantially the same manner as that described in Example 1 except that a preparation containing 90% $Y_2O_3$ and 10% Z10M on a volume basis was used in a second preparation step. In Example 3, an yttrium oxide material was prepared in substantially the same manner as that described in Example 1 except that a preparation containing 80% $Y_2O_3$ and 20% Z10M on a volume basis was used in a second preparation step.

Examples 4 to 6

In Example 4, an yttrium oxide material was prepared in substantially the same manner as that described in Example 1 except that a preparation containing 95% $Y_2O_3$ and 5% Z13M on a volume basis was used in a second preparation step. In Example 5, an yttrium oxide material was prepared in substantially the same manner as that described in Example 1 except that a preparation containing 90% $Y_2O_3$ and 10% Z13M on a volume basis was used in a second preparation step. In Example 6, an yttrium oxide material was prepared in substantially the same manner as that described in Example 1 except that a preparation containing 80% $Y_2O_3$ and 20% Z13M on a volume basis was used in a second preparation step.

Examples 7 and 9 to 11

In Example 7, an yttrium oxide material was prepared in substantially the same manner as that described in Example 2 except that hot press firing was performed at 1600° C. in a second preparation step and heat treatment was performed at 1200° C., which was lower than the firing temperature, for four hours in a nitrogen atmosphere in a heat treatment step. In Example 9, an yttrium oxide material was prepared in substantially the same manner as that described in Example 1 except that heat treatment was performed at 1400° C. for four hours in a nitrogen atmosphere in a heat treatment step. In Example 10, an yttrium oxide material was prepared in substantially the same manner as that described in Example 2 except that heat treatment was performed at 1400° C. for four hours in a nitrogen atmosphere in a heat treatment step. In Example 11, an yttrium oxide material was prepared in substantially the same manner as that described in Example 3 except that heat treatment was performed at 1400° C. for four hours in a nitrogen atmosphere in a heat treatment step.

Examples 8 and 12

In Example 8, an yttrium oxide material was prepared in substantially the same manner as that described in Example 5 except that hot press firing was performed at 1600° C. in a second preparation step and then heat-treated at 1200° C., which was lower than the firing temperature, for four hours in a nitrogen atmosphere in a heat treatment step. In Example 12, an yttrium oxide material was prepared in substantially the same manner as that described in Example 6 except that heat treatment was performed at 1400° C. for four hours in a nitrogen atmosphere in a heat treatment step.

Examples 13 to 15

In Example 13, an yttrium oxide material was prepared in substantially the same manner as that described in Example 1 except that a preparation containing 94% $Y_2O_3$, 5% Z10M, and 1% $YF_3$ on a volume basis was prepared and then subjected to hot press firing at 1400° C. in a second preparation step. In Example 14, an yttrium oxide material was prepared in substantially the same manner as that described in Example 1 except that a preparation containing 89% $Y_2O_3$, 10% Z10M, and 1% $YF_3$ on a volume basis was prepared and then subjected to hot press firing at 1400° C. in a second preparation step. In Example 15, an yttrium oxide material was prepared in substantially the same manner as that described in Example 1 except that a preparation containing 79% $Y_2O_3$, 20% Z10M, and 1% $YF_3$ on a volume basis was prepared and then subjected to hot press firing at 1400° C. in a second preparation step.

Examples 16 to 18

In Example 16, an yttrium oxide material was prepared in substantially the same manner as that described in Example 1 except that a preparation containing 94% $Y_2O_3$, 5% Z13M, and 1% $YF_3$ on a volume basis was prepared and then subjected to hot press firing at 1500° C. in a second preparation step. In Example 17, an yttrium oxide material was prepared in substantially the same manner as that described in Example 1 except that a preparation containing 89% $Y_2O_3$, 10% Z13M, and 1% $YF_3$ on a volume basis was prepared and then subjected to hot press firing at 1500° C. in a second preparation step. In Example 18, an yttrium oxide material was prepared in substantially the same manner as that described in Example 1 except that a preparation containing 79% $Y_2O_3$, 20% Z13M, and 1% $YF_3$ on a volume basis was prepared and then subjected to hot press firing at 1500° C. in a second preparation step.

Examples 19 to 21

In Example 19, an yttrium oxide material was prepared in substantially the same manner as that described in Example 1 except that 100% by volume $Y_2O_3$ was used in a second preparation step. In Example 20, an yttrium oxide material was prepared in substantially the same manner as that described in Example 1 except that a preparation containing 94.1% $Y_2O_3$ and 5.9% MgO on a volume basis was prepared in a second preparation step. In Example 21, an yttrium oxide material was prepared in substantially the same manner as that described in Example 1 except that a first preparation step was not performed and a preparation containing 80% $Y_2O_3$, 15% $ZrO_2$, and 5% MgO on a volume basis was prepared in a second preparation step. $ZrO_2$ and MgO used herein were analyzed with a laser diffraction-scattering particle size distribution analyzer, LA-750, available from Horiba Limited using water as a dispersion medium. The analysis showed that the average particle size (median diameter (D50)) of each of $ZrO_2$ and MgO used was 1 μm.

Phase Assessment

The yttrium oxide materials of Examples 1 to 21 were analyzed with an X-ray diffractometer (a rotating anode X-ray diffractometer, RINT, available from Rigaku Corporation; a CuKα X-ray source; 50 kV; 300 mA; and 2θ=10 to 70 degrees) and crystal phases were identified from the obtained X-ray diffraction patterns. As a result, $Y_2O_3$, $ZrO_2$, and MgO were identified in the yttrium oxide materials of Examples 1 to 18 and 21; $Y_2O_3$ was identified in the yttrium oxide material of Example 19; and $Y_2O_3$ and MgO were identified in the yttrium oxide material of Example 20.

Electron Microscope Observation

The yttrium oxide materials of Examples 10, 12, 18, and 21 were photographed using a scanning electron microscope, JSM-6390, available from JOEL Ltd. In SEM observation, thermally etched surfaces of the yttrium oxide materials of these examples were observed. The average size of yttrium oxide grains and that of magnesium oxide particles SEM observed were determined in such a manner that grains or particles present in each observed region were measured for breadth and the obtained measurements were averaged.

Measurement of Strength

The yttrium oxide materials of Examples 1 to 21 were measured for strength by a four-point bending test according to JIS-R 1601 using a strength testing machine, S500C, available from Shimadzu Corporation.

Measurement of Density and Open Porosity

The yttrium oxide materials of Examples 1 to 21 were evaluated for density and open porosity by an Archimedean method in accordance with JIS-R 1634 using pure water as a medium. The density of each yttrium oxide material was determined in the form of bulk density.

Measurement of Volume Resistivity

The yttrium oxide materials of Examples 1 to 21 were measured for volume resistivity at room temperature in air by a method according to JIS-C 2141. A specimen having a diameter of 50 mm and a length of 1 mm was taken from each yttrium oxide material. The following electrodes were formed from a silver paste on the specimen: a main electrode with a diameter of 20 mm, a guard electrode having an inner diameter of 30 mm and an outer diameter of 40 mm, an application electrode with a diameter of 40 mm. The current flowing through the specimen was read one minute after a voltage of 0.1 to 500 V/mm was applied to the specimen. The volume resistivity of the specimen was calculated from the read current.

Chemical Analysis

The yttrium oxide materials of Examples 13 to 18 were measured for fluorine content. In particular, the content of fluorine in each yttrium oxide material was measured by a fluorine determination method according to JIS-R 1675 in such a manner that a solution separated from thermal hydrolysates of the yttrium oxide material was measured by ion chromatography. The obtained results showed that the amount of fluorine remaining in each of the yttrium oxide materials of Examples 13 to 18 was substantially equal to that of fluorine added to each thereof.

Measurement Results

Figure 3:
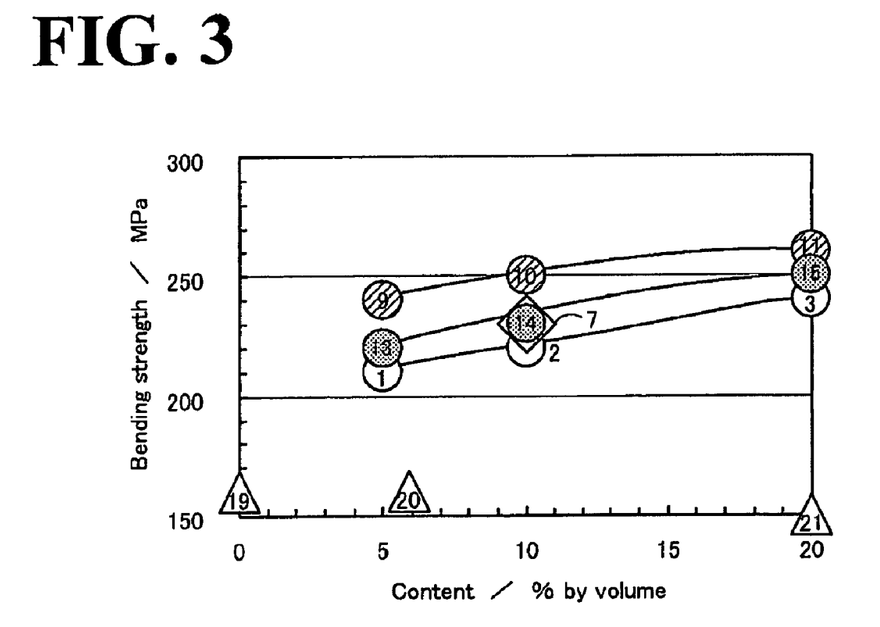
FIG. 3 is a graph showing the relationship between the content of Z10M in each of yttrium oxide materials prepared in examples and the bending strength of each thereof in comparison with yttrium oxide materials containing no Z10M.
Figure 4:
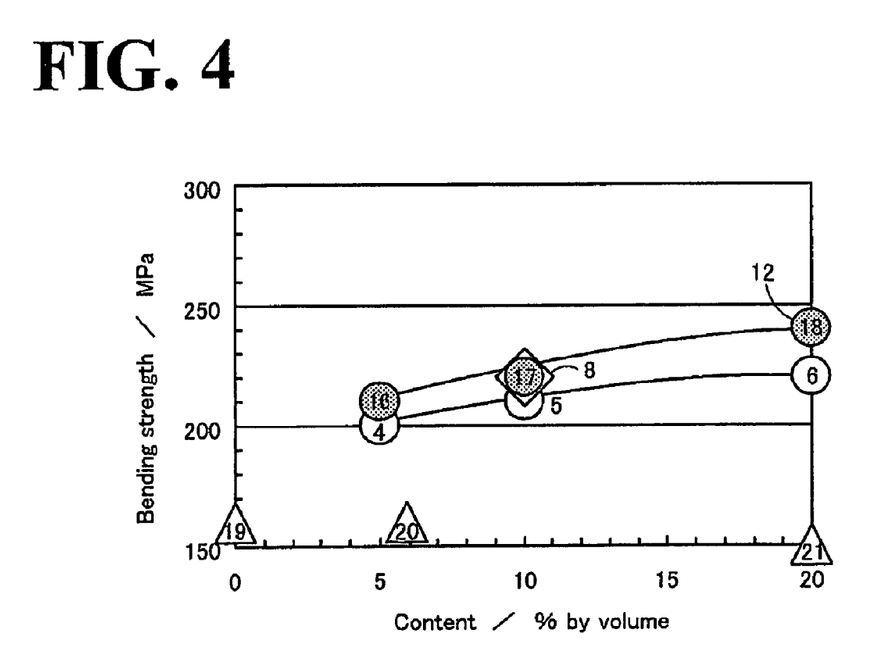
FIG. 4 is a graph showing the relationship between the content of Z13M in each of yttrium oxide materials prepared in examples and the bending strength of each thereof in comparison with yttrium oxide materials containing no Z13M.
Figure 5A:
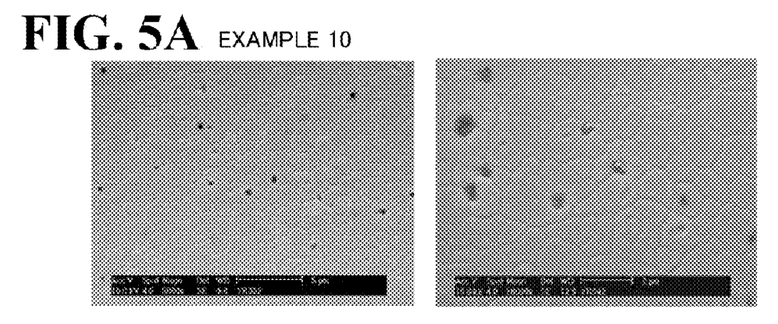
FIG. 5A is a cross-sectional SEM image of an yttrium oxide material prepared in Example 10.
Figure 5B:
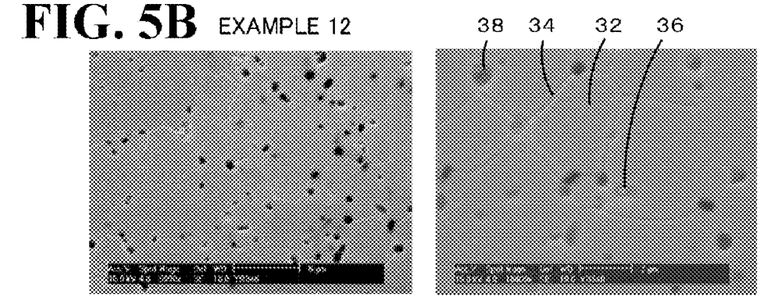
FIG. 5B is a cross-sectional SEM image of an yttrium oxide material prepared in Example 12.
Figure 5C:
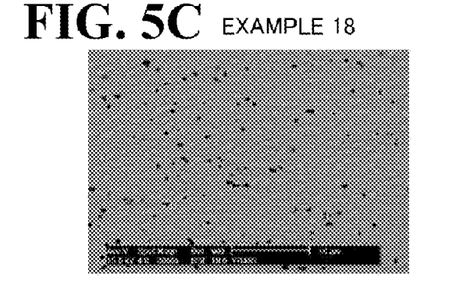
FIG. 5C is a cross-sectional SEM image of an yttrium oxide material prepared in Example 18.
Figure 5D:
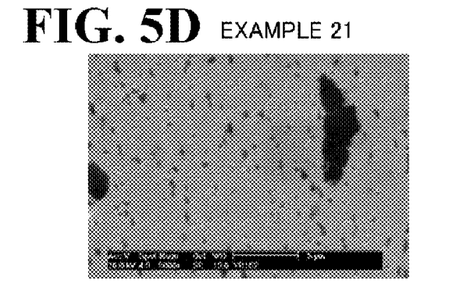
FIG. 5D is a cross-sectional SEM image of an yttrium oxide material prepared in Example 21.

Table 1 shows the measurement results of the yttrium oxide material of each example. FIG. 3 shows the relationship between the content of Z10M in each of the yttrium oxide materials of Examples 1 to 3, 7, 9 to 11, and 13 to 15 and the bending strength of each thereof in comparison with the yttrium oxide materials of Examples 19 to 21 that contain no Z10M. FIG. 4 shows the relationship between the content of Z13M in each of the yttrium oxide materials of Examples 4 to 6, 8, 12, 16 to 18 and the bending strength of each thereof in comparison with the yttrium oxide materials of Examples 19 to 21 that contain no Z13M. FIGS. 5A, 5B, 5C, and 5D are a cross-sectional SEM image of the yttrium oxide material of Example 10, that of Example 12, that of Example 18, and that of Example 21, respectively. In each of FIGS. 3 and 4, the following contents are plotted on the horizontal axis: the MgO content of the yttrium oxide material of Example 20 and the ZrO$_2$ and MgO content of the yttrium oxide material of Example 21. In FIGS. 3 and 4, a symbol representing each heat-treated yttrium oxide material is diagonally hatched, a symbol representing each yttrium oxide material containing YF$_3$ is cross-hatched, and the number of each example is given in a symbol for the purpose of facilitating understanding. As is clear from FIGS. 3 and 4, the measurement results show that an increase in Z10M or Z13M content increases bending strength. The yttrium oxide materials of Examples 1 to 18 that contain Z10M or Z13M are higher in bending strength than the yttrium oxide material of Example 19 that contains no Z10M or Z13M, the yttrium oxide material of Example 20 that contains MgO, and the yttrium oxide material of Example 21 that contains ZrO$_2$ and MgO that were not converted into solid solutions. The heat-treated yttrium oxide materials have higher bending strength as compared to those not heat-treated. The yttrium oxide materials containing YF$_3$ have sufficiently high bending strength even if the firing temperatures are low as shown in Table 1. As shown in FIGS. 5A to 5C, in the yttrium oxide materials of Examples 10, 12, and 18, zirconium oxide particles 36 are present in yttrium oxide grains 32 and magnesium oxide particles 38 are present at boundaries 34 between the yttrium oxide grains 32. The zirconium oxide particles 36 and the magnesium oxide particles 38 have an average size of 1 μm or less. It is clear that the yttrium oxide materials having such a configuration have high bending strength. In the yttrium oxide material of Example 21, extremely large MgO particles are present.

cipitated from yttrium oxide at a second temperature lower than the first temperature, and which are present in grains of yttrium oxide; and second inorganic particles which can form solid solutions in the first inorganic particles, which have a solid solubility limit, for yttrium oxide, less than that of the first inorganic particles, and which are present at boundaries between the yttrium oxide grains.

2. The yttrium oxide material according to claim 1, wherein the first inorganic particles contain at least one of ZrO$_2$ and HfO$_2$ and the second inorganic particles contain at least one selected from the group consisting of MgO, CaO, SrO, and BaO.

3. The yttrium oxide material according to claim 1, further containing fluorine.

4. The yttrium oxide material according to claim 1, wherein the first inorganic particles have an average particle size of 1 μm or less.

5. The yttrium oxide material according to claim 1, wherein the second inorganic particles have an average particle size of 1 μm or less.

6. A member for a semiconductor-manufacturing apparatus, containing the yttrium oxide material according to claim 1.

7. A method for producing an yttrium oxide material, comprising:

a first preparation step of preparing solid solution particles in such a manner that a first source powder containing first inorganic particles which form solid solutions in

TABLE 1

| | Y$_2$O$_3$ Vol % | Z10M[1)] Vol % | Z13M[2)] Vol % | YF$_3$ Vol % | Firing temperature[3)] ° C. | Heat treatment[4)] ° C. | Strength MPa | Density g/cm$^3$ | Open Porosity % | Volume resistivity Ωcm |
|---|---|---|---|---|---|---|---|---|---|---|
| Example 1 | 95 | 5 | 0 | 0 | 1600 | — | 210 | 5.06 | 0.01 | 10$^{16}$ or more |
| Example 2 | 90 | 10 | 0 | 0 | 1600 | — | 220 | 5.11 | 0.01 | 10$^{16}$ or more |
| Example 3 | 80 | 20 | 0 | 0 | 1600 | — | 240 | 5.21 | 0.00 | 10$^{16}$ or more |
| Example 4 | 95 | 0 | 5 | 0 | 1600 | — | 200 | 5.07 | 0.00 | 10$^{16}$ or more |
| Example 5 | 90 | 0 | 10 | 0 | 1600 | — | 210 | 5.11 | 0.01 | 10$^{16}$ or more |
| Example 6 | 80 | 0 | 20 | 0 | 1600 | — | 220 | 5.19 | 0.03 | 10$^{16}$ or more |
| Example 7 | 90 | 10 | 0 | 0 | 1600 | 1200 | 230 | 5.11 | 0.00 | 10$^{16}$ or more |
| Example 8 | 90 | 0 | 10 | 0 | 1600 | 1200 | 220 | 5.11 | 0.01 | 10$^{16}$ or more |
| Example 9 | 95 | 5 | 0 | 0 | 1600 | 1400 | 240 | 5.06 | 0.00 | 10$^{16}$ or more |
| Example 10 | 90 | 10 | 0 | 0 | 1600 | 1400 | 250 | 5.10 | 0.01 | 10$^{16}$ or more |
| Example 11 | 80 | 20 | 0 | 0 | 1600 | 1400 | 260 | 5.20 | 0.02 | 10$^{16}$ or more |
| Example 12 | 80 | 0 | 20 | 0 | 1600 | 1400 | 240 | 5.11 | 0.01 | 10$^{16}$ or more |
| Example 13 | 94 | 5 | 0 | 1 | 1400 | — | 220 | 5.08 | 0.01 | 10$^{16}$ or more |
| Example 14 | 89 | 10 | 0 | 1 | 1400 | — | 230 | 5.11 | 0.01 | 10$^{16}$ or more |
| Example 15 | 79 | 20 | 0 | 1 | 1400 | — | 250 | 5.19 | 0.03 | 10$^{16}$ or more |
| Example 16 | 94 | 0 | 5 | 1 | 1500 | — | 210 | 5.08 | 0.01 | 10$^{16}$ or more |
| Example 17 | 89 | 0 | 10 | 1 | 1500 | — | 220 | 5.11 | 0.00 | 10$^{16}$ or more |
| Example 18 | 79 | 0 | 20 | 1 | 1500 | — | 240 | 5.20 | 0.00 | 10$^{16}$ or more |
| Example 19 | 100 | 0 | 0 | 0 | 1600 | — | 160 | 5.03 | 0.00 | 10$^{16}$ or more |
| Example 20 | 94.1 | (5.9)[5)] | 0 | 0 | 1600 | — | 160 | 4.92 | 0.03 | 10$^{16}$ or more |
| Example 21 | 80 | (20)[6)] | 0 | 0 | 1500 | — | 150 | 5.19 | 0.01 | 10$^{16}$ or more |

[1)]Z10M = 90 mol % ZrO$_2$—10 mol % MgO
[2)]Z13M = 87 mol % ZrO$_2$—13 mol % MgO
[3)]Firing of 4 hours under nitrogen atmosphere
[4)]Heat treatment of 4 hours under nitrogen atmosphere following the firing
[5)]5.9 Vol % MgO
[6)]15 Vol % ZrO$_2$—5 Vol % MgO The present application claims priority from the Japanese Patent Application No. 2008-061334 filed on Mar. 11, 2008, the entire contents of which are incorporated herein by reference.

What is claimed is:

1. An yttrium oxide material containing:

first inorganic particles which form solid solutions in yttrium oxide at a first temperature, which can be preyttrium oxide at a first temperature and which can be precipitated from yttrium oxide at a second temperature lower than the first temperature is mixed with a second source powder containing second inorganic particles which can form solid solutions in the first inorganic particles and which have a solid solubility limit, for yttrium oxide, less than that of the first inorganic particles and the mixture is fired; and a second preparation step of mixing the solid solution particles with a third source powder containing yttrium oxide and firing the mixture of the solid solution particles and the third source powder such that the first inorganic particles are present in grains of yttrium oxide and the second inorganic particles are present at boundaries between the yttrium oxide grains.

8. The method according to claim 7, wherein the first inorganic particles contain at least one of $ZrO_2$ and $HfO_2$ and the second inorganic particles contain at least one selected from the group consisting of MgO, CaO, SrO, and BaO in the first preparation step.

9. The method according to claim 7, wherein the first source powder contains $ZrO_2$, the second source powder contains MgO, and the mixture of the first and second source powders is fired at 1400° C. to 1800° C. in the first preparation step.

10. The method according to claim 7, further comprising a heat treatment step of performing heat treatment at a temperature lower than the firing temperature of the second preparation step, the heat treatment step being subsequent to the second preparation step.

11. The method according to claim 7, wherein the first source powder contains $ZrO_2$, the second source powder contains MgO, the mixture of the first and second source powders is fired at 1400° C. to 1800° C. in the first preparation step, and heat treatment is performed subsequently to the second preparation step at 1000° C. to 1600° C., which is lower than the firing temperature of the second preparation step, in the heat treatment step.

12. The method according to claim 7, wherein the solid solution particles prepared in the first preparation step and the third source powder containing yttrium oxide are mixed with $YF_3$ in the second preparation step.

* * * * *